United States Patent
Caretta et al.

(10) Patent No.: US 6,313,212 B1
(45) Date of Patent: Nov. 6, 2001

(54) CONTINUOUS PROCESS FOR PRODUCING SEMI-FINISHED RUBBER PRODUCTS WITH A SILICA REINFORCING FILLER, FOR TYRES, AND TYRES THUS PRODUCED

(75) Inventors: Renato Caretta, Gallarate; Roberto Pessina, Paderno Dugnano; Antonio Proni, Lodi, all of (IT)

(73) Assignee: Pirelli Coordinamento Pneumatici S.p.A., Milan (IT)

( * ) Notice: Subject to any disclaimer, the term of this patent is extended or adjusted under 35 U.S.C. 154(b) by 0 days.

(21) Appl. No.: 09/159,615

(22) Filed: Sep. 24, 1998

Related U.S. Application Data
(60) Provisional application No. 60/071,723, filed on Jan. 16, 1998.

(30) Foreign Application Priority Data
Sep. 25, 1997 (EP) ................................................. 97830470

(51) Int. Cl.⁷ ........................................................ C08K 3/34
(52) U.S. Cl. .................... 524/493; 524/492; 264/211.18; 264/211.21; 264/211.28; 264/211.24
(58) Field of Search ..................................... 524/492, 493; 264/211.18, 211.21, 211.23, 211.24

(56) References Cited

U.S. PATENT DOCUMENTS

| | | | |
|---|---|---|---|
| 4,107,787 | 8/1978 | Ocker | 366/75 |
| 4,416,543 | 11/1983 | Brinkmann | 366/80 |
| 5,011,291 | 4/1991 | Peter | 366/91 |
| 5,049,220 | 9/1991 | Gartland et al. | 156/116 |
| 5,227,425 | 7/1993 | Rauline . | |
| 5,358,693 | 10/1994 | Brinkmann et al. . | |
| 5,409,978 | 4/1995 | Hamada et al. . | |
| 5,580,919 | 12/1996 | Aqostini et al. . | |
| 5,605,951 | 2/1997 | Sandstrom et al. . | |
| 5,674,932 | 10/1997 | Agostini et al. | 524/430 |
| 5,711,904 | 1/1998 | Eswaran et al. | 264/40.7 |
| 5,904,885 | 5/1999 | Arastoopour et al. | 264/115 |
| 6,044,882 | 4/2000 | Crawford et al. | 152/152.1 |

FOREIGN PATENT DOCUMENTS

| | | |
|---|---|---|
| 0 258 159 B1 | 3/1988 | (EP) . |
| 0 663 421 A1 | 7/1995 | (EP) . |
| 0 728 803 A1 | 8/1996 | (EP) . |
| 0 775 719 A2 | 5/1997 | (EP) . |

OTHER PUBLICATIONS

S. Wolff et al., "Silica–Based Tread Compounds: Background and Performance" Dequssa—Tyretech '93 Conference, p. 14, Table IV, (1993).

*Primary Examiner*—Edward J. Cain
*Assistant Examiner*—Katarzyna Wyrozebski
(74) *Attorney, Agent, or Firm*—Finnegan, Henderson, Farabow, Garrett & Dunner, L.L.P.

(57) ABSTRACT

A process for producing a rubber compound for tires, where the ingredients of the rubber compound include: a polymer base containing an unsaturated chain which can be crosslinked with sulphur-based systems; at least one silica-based reinforcing filler; a silica-binding agent including a silane containing at least one sulphur atom; and a vulcanizing system. The process includes the steps of feeding the polymer base, the silica-based reinforcing filler, and the silica-binding agent ingredients continuously into a path for mixing and advancing an ingredient blend, wherein the mixing and advancing of the blend take place together. The path includes an initial stretch, an intermediate stretch, and a final stretch; each stretch defined between respective inlet and outlet sections. The process also includes controlling a heat profile of the blend in the initial stretch to maintain temperature and viscosity values for the blend in the outlet section of the initial stretch within defined ranges, and feeding the vulcanizing system continuously into the inlet section of the final stretch.

30 Claims, 3 Drawing Sheets

CONTINUOUS PROCESS FOR PRODUCING SEMI-FINISHED RUBBER PRODUCTS WITH A SILICA REINFORCING FILLER, FOR TYRES, AND TYRES THUS PRODUCED

Applicants claim the right of priority under 35 U.S.C. §119(a)–(d) based on patent application Ser. No. 97830470.7, filed Sep. 25, 1997, in the European Patent Office; additionally, Applicants claim the benefit under 35 U.S.C. §119(e) based on prior-filed, copending provisional application Ser. No. 60/071,723, filed Jan. 16, 1998, in the U.S. Patent and Trademark Office; the contents of both of which are relied upon and incorporated herein by reference.

The present invention relates to a continuous process for producing a rubber compound which can be hot-crosslinked with sulphur, comprising a polymer base containing a crosslinkable unsaturated chain, supplemented with at least one silica filler and a silica-binding agent containing at least one sulphur atom; more specifically, the invention relates to a process for producing semi-finished products formed from the said compound, in particular tread bands, as well as to tires which can be obtained from the said semi-finished products.

In the following description and in the subsequent claims, the expression polymer base containing a crosslinkable unsaturated chain is intended to refer to any natural or synthetic, non-crosslinked polymer which can acquire all the physico-chemical and mechanical properties typical of elastomers after crosslinking (vulcanization) with sulphur-based systems.

The semi-finished products for tires to which the invention relates are formed of compounds of varying chemical composition, which are appropriately selected in order to obtain, after vulcanization, tires with particular properties and performance levels.

The said semi-finished products are, in particular, tire side walls and tread bands.

In certain applications, semi-finished products for tires with rubber reinforced by so-called "white" fillers are required; purely as a guide, it is pointed out here that these are inorganic-type reinforcing fillers such as chalk, talc, kaolin, bentonite, titanium dioxide, silicates of various types and silica, which are referred to hereinbelow as silica fillers for simplicity. In particular, it is known to use tread rubbers which comprise reinforcing silica fillers in order to reduce the tire's resistance to rolling.

Since silica has little affinity for the polymer base, it is necessary to add a silica-binding agent, advantageously consisting of a silane, which is capable of chemically attaching the silica to the polymer matrix during vulcanization of the compound: the abovementioned chemical attachment is optimally achieved when the silica and the silane are incorporated into the compound together.

However, the need to incorporate the silica and the silane together into the compound places a constraint on the maximum temperature which can be reached during the mechanical processing of the compound by mixing: the temperature needs to be carefully maintained below 165° C., otherwise irreversible thermal degradation of the binding agent takes place.

Unfortunately, in complying with this temperature constraint, there is a substantial reduction precisely in this mechanical mixing action, which is essential for optimum dispersion of the silica in the polymer matrix.

The resulting insufficient dispersion of the silica in the compound in turn gives rise to a whole range of drawbacks essentially related to large variability and non-uniformity of the physico-mechanical properties of the mixture between one region and another.

Moreover, incorporation of the vulcanizing system into the compound also requires that a temperature of 110° C. is not exceeded during processing, and since each mechanical processing operation involves a gradual increase in the temperature of the compound, the abovementioned compounds are produced by the so-called "batchwise" system, that is to say in non-continuous amounts, of about 200–300 kilograms for each load, so as to be able to stop the processing cycle in order to carry out alternating cooling cycles during manufacture of the compound.

A general process for the mechanical processing of a rubber compound with silica and silane is the subject of the publication "Silica based tread compounds: Background and performances", page 14, table IV, published by Degussa on the occasion of the Tyretech '93 conference which was held in Basilea on Oct. 28–29 1993.

According to that process, the silica and silane are added to the rubber compound at the same time, while keeping the processing temperature below 160–165° C. in order to avoid premature crosslinking of the silane from taking place by exceeding this temperature.

From U.S. Pat. No. 5,227,425, a process is also known for the production of tread bands which are obtained by mixing a polymer base formed of a diene conjugated with a vinylaromatic compound having a vinyl group content of between 5% and 50%, this polymer base having a high silica content and containing a silane.

The base polymer and the silica undergo mechanical processing in a mixer or extruder until a minimum temperature of 130° C. but one not exceeding 180° C., and preferably between 145° C. and 180° C. is reached. According to another example, the polymer and the silica undergo mechanical processing in two distinct phases separated from each other by an intermediate cooling phase. In the first phase, the base polymer, the silica and crosslinking agent undergo mechanical processing until a temperature above 145° C., preferably between 145 and 170° C., is reached.

The blend obtained is cooled to a temperature below 100° C., preferably about 60° C., and, in a second phase, it then undergoes mechanical processing in a Banbury mixer (internal mixer) together with other ingredients, but not the vulcanization system, until a temperature of between 145 and 170° C. is again reached.

Next, the blend thus obtained is again cooled to a temperature below 100° C., preferably about 60° C., after which the vulcanization system is added to the blend by means of a final mechanical processing operation in a two-cylinder mixer (external mixer), while keeping the temperature at a value below 100° C.

Italian patent application No. 95IT-MI000359A, from the same Applicant, which is aimed at improving the dispersion of the silica in the base polymer, describes a process in which, firstly, the base polymer is mixed with the silica in a closed rotary mixer (Banbury) until a temperature of between 165 and 180° C. is reached, after which the blend is cooled to room temperature.

In a second phase, the silane is added and the compound and the silane-binding agent again undergo intimate mixing in a Banbury mixer until a temperature of 135° C. is reached, after which the compound is again cooled to room temperature.

In a final phase, the ingredients of the vulcanization system are added to the compound and further mixing is carried out in a Banbury mixer without exceeding a temperature of 100° C.

A number of continuous processes in which silicone rubbers, reinforcing fillers, including silica, and further ingredients, including silanes, are mixed together, are likewise known from patents EP 0,258,159 B1 and U.S. Pat. No. 5,409,978.

In particular, the process of patent EP 0,258,159 B1 uses a twin-screw mixer followed in series by a single-screw extruder whose outlet is fitted with a filter placed before a die.

The twin-screw mixer comprises two screws arranged side by side which rotate in the same direction.

The charge introduced into the twin-screw mixer is composed of the base polymer, available from silicon product manufacturers, a powdered charge such as silica and silane compounds.

The compound leaves the twin-screw mixer at a temperature of between 150 and 250° C. and is introduced directly into the single-screw extruder, passing, at the end, through the filter and the die, from which it exits at a temperature of between 120 and 220° C.

In a further example, it is mentioned that the compound leaves the twin-screw mixer at 231° C. and at a pressure of 2 bar; the compound is then conveyed to the filtering zone at a pressure of 70 bar and leaves the die at 170° C.

The description gives no indication as to the addition of vulcanization agents.

The process of U.S. Pat. No. 5,409,978 uses two twin-screw mixers for obtaining a silicone rubber compound; the first mixer comprises a pair of screws rotating in the same direction, while in the second the screws rotate in opposite directions. The base polymer, the silica and the silane ingredients are mixed in the first mixer, until a temperature of between 200 and 300° C. is reached.

The extrudate is conveyed directly to the second mixer, which it leaves at a temperature of between 150 and 300° C. These temperatures are tolerable since the silane ingredients used contain no sulphur and therefore cannot initiate premature vulcanization.

The cooling can be carried out using, for example, a conveyor belt or an extruder comprising a single screw, with means for controlling the temperature.

The product obtained is formed of a silicone rubber compound which can be converted into a silicone rubber by heating after a vulcanization agent in the form of a peroxide has been added.

An inspection of the prior art shows that full examples of teaching are still not available, or otherwise known, which can be used for providing rapidly implementing continuous processes which involve little or no changing of equipment and contained labour costs, for producing semi-finished products made of reinforced rubber with silica fillers, in particular tread bands, thereby making it possible to achieve a high level of uniformity in the properties and thus performance of the product when in use.

On the one hand, batchwise processes using apparatus known under the name Banbury involve non-continuous processing of the compounds and, although the quality of their products is good, they do not satisfy the demand for speed of processing and lower manufacturing costs, and, on the other hand, continuous processes, as seen, are not suitable for the manufacture of semi-finished products for tire technology, in particular for the production of tread bands with a high silica content.

The continuous processes referred to earlier in the prior art carry out phases of mixing a base polymer added to reinforcing fillers including silica and silane components in order to obtain a silicone rubber.

It should first of all be pointed out that silicone rubber cannot be used in the manufacture of semi-finished products for tires, especially tread bands, and furthermore that the high temperatures, of 200° C. and over described in the known continuous processes, can be accepted only because the compounds concerned contain silanes free of sulphur atoms. If the compound were to contain silanes with sulphur atoms, as is the case in the process of the present invention, premature vulcanization and, more generally, degradation of the silane would be encountered at the temperatures indicated in the continuous processes of the prior art, resulting in scorching of the compound, the presence of lumps and other impairments.

Thus, although continuous processes can be carried out using machinery which overcomes the non-continuity of processes associated with the use of a Banbury mixer, such as twin-screw mixers and single-screw extruders, they are best for the production of semi-finished products that are different from those required for use in tires and, if used, they would make tires produced with this machinery unacceptable.

It should also be observed that there is an ever-increasing need to produce tires, and thus the related semi-finished products, in particular tread bands, with a very high degree of uniformity in industrial-scale productions since, given current market globalization, all tires of the same model, identical size and tread design have to maintain, for all potential clients and in all markets, the same levels of quality, which is generally a specific selling point, focusing in particular on resistance to abrasion, road-holding in dry and wet conditions, low resistance to rolling and excellent road handling.

The uniform performance of the tread rubber depends on the presence of uniform properties as regards the physical and chemical parameters of the corresponding compound.

The Applicant has found that of the physical parameters, the crude viscosity, the breaking load and the modulus, measured at 100% and at 300% elongation, determined on the vulcanized compound, are very significant; while of the chemical parameters, the degree of silanization acquires great importance. The Applicant's aim was to achieve high uniformity of properties for the tread bands, with minimal standard deviations between different tires of the same type.

In other words, if a certain number of tread bands of the same compound are considered and the properties mentioned above measured, a good result would be felt to have been reached if, for each property, essentially 100% of the treads considered had minimal deviations from the average value for this property.

We will return to this point in greater detail and with more in-depth explanations later.

Unfortunately, the known techniques relating to continuous processes are lacking in useful information in terms of how to achieve the abovementioned values of uniformity with minimum standard deviation.

In this sector, the Applicant, starting from the known art relating to the production of compounds for semi-finished products, in particular tread bands, produced non-continuously as described in its Italian patent application No. MI95000359A addressed the technical problem of developing a continuous process which would give very high values of uniformity in the compounds, with standard deviations of the values of the moduli CA1 and CA3 (at 100% and at 300% elongation) from the average value which are less than 0.5 and standard deviations of the values of the viscosity of the crude compound, from the average value of the said viscosity, which are less than 6 and preferably less than 5.5

The Applicant saw intuitively that the problem could be solved by using a process based on the continuous processing of a blend consisting of the base polymer and the various ingredients added in measured amounts and at defined points along a path of mixing and conveying of the blend by alternating phases mainly involving mixing, with a high level of absorption of mechanical work, with phases mainly involving blend advance, with a reduced level of absorption of work, while maintaining the specific value of a few physical parameters, which are taken as characterizing the heat profile of the blend, within a predetermined range by controlling the heat profile of the said blend along at least one defined stretch of the said path along which the blend is mixed and advanced.

Preferably, this control is carried out by determining the value of the said physical parameters at least at predetermined points on the said path.

The temperature and the viscosity were preferentially taken as physical parameters which characterize the abovementioned heat profile.

In one of its aspects, the invention relates to a process for producing a rubber compound, for use in vehicle wheel tires, whose ingredients include a polymer base containing an unsaturated chain which can be crosslinked with sulphur-based systems, at least one silica-based reinforcing filler, a silica-binding agent based on a silane containing at least one sulphur atom and a vulcanizing system, this process comprising the phases of feeding the said ingredients continuously into a path for mixing and advancing the blend, along which mixing of the said ingredients and advance of the blend take place together, the said path having an initial stretch, an intermediate stretch and a final stretch, each of the said stretches being defined between a blend inlet section and a blend outlet section, the outlet section of each stretch essentially matching up with the inlet section of the next stretch, feeding the said vulcanizing system continuously into the inlet section of the final stretch, and maintaining, in the said outlet section of the said first stretch, temperature and viscosity values for the said blend within a defined range by means of controlling the heat profile of the said blend inside the said first stretch.

Preferably, this control is carried out by determining the said temperature and viscosity values each in at least one respective first intermediate section, lying between the inlet and outlet sections of the said first stretch, and, even more preferably, in the same first intermediate section A, preferably located at a distance from the inlet section of the said first stretch which is between 55% and 65% of the distance L which exists between the inlet and outlet sections of the said first stretch.

Even more preferably, the abovementioned heat profile has a temperature $T_A$ between 110 and 120° C. and a viscosity $\eta_A$ between 540 and 660 Pa*s at the temperature $T_A$ in the said first intermediate section and a temperature $T_C$ between 150 and 160° C. and a viscosity $\eta_C$ between 300 and 380 Pa*s at the temperature $T_C$ in the said outlet section of the said initial stretch.

Preferably, the process of the invention also comprises the phase of cooling the blend in the said intermediate stretch in a manner which is protected from variations in ambient temperature.

Preferably, the abovementioned heat profile is controlled by also determining the said temperature and viscosity values each in at least one respective second intermediate section, lying between the said inlet and outlet sections of the said first stretch.

More preferably, the said second intermediate sections coincide in a single second intermediate section B, located at a distance from the inlet section of the said initial stretch which is between 35% and 45% of the distance which exists between the said inlet and outlet sections of the said initial stretch: even more preferably, the said heat profile has a temperature $T_B$ between 55° C. and 65° C. and a viscosity $\eta_B$ between 8500 Pa*s and 7000 Pa*s at the temperature $T_B$ in the said second intermediate section.

As regards the other points of control, preferably, the said heat profile has a temperature $T_E$ between 100 and 110° C. and a viscosity $\eta_E$ between 600 and 650 Pa*s at the temperature $T_E$ at the inlet section of the said final stretch, and, even more preferably, a temperature $T_F$ not above 110° C. and a viscosity $\eta_F$ between 550 and 600 Pa*s at the temperature $T_F$ in the said outlet section of the said final stretch.

Preferably, the initial stretch of the said path for mixing and advancing the blend is formed by a twin-screw mixer with screws preferably rotating in opposite directions; even more preferably, the spin speed of the said screws is between 45 and 55 revolutions/minute.

Still in accordance with another preferred version, the final stretch of the said path for mixing and advancing the blend is formed by a single-screw extruder; even more preferably, the spin speed of the said screw is between 35 and 45 revolutions/minute.

In a preferred embodiment of the abovementioned process, the throughput of the said blend along the said mixing and advance path is between 200 and 400 kg/hour, preferably with a rate of advance of the said blend in the said initial stretch of between 0.5 and 1.5 cm/sec and with the throughput time in the said mixing and advance path, from the inlet section of the said initial stretch to the outlet section of the said final stretch, at between 5 and 10 minutes.

In a second aspect, the invention relates to a semi-finished product extruded by a plant for the continuous production of a rubber compound, for use in tires for vehicle wheels, which includes between the ingredients a polymer base containing an unsaturated chain which can be crosslinked with sulphur-based systems, at least one silica-based reinforcing filler, a silica-binding agent based on a silane containing at least one sulphur atom and a vulcanizing system, produced by the continuous process stated above, characterized in that the compound of the said semi-finished extrudate has a viscosity, measured at a temperature of 100° C., above 76 ML (Mooney). Preferably, the abovementioned viscosity has a value of between 78 and 82 ML (Mooney).

In particular, according to a preferred embodiment, this semi-finished product forms a continuous strip of indefinite length, designed to form tire tread bands.

In a third aspect, the invention relates to a tire for a vehicle wheel, comprising a casing formed of at least one reinforcing ply folded up at its edges around a pair of bead-cores, a tread band and a belt placed between the casing and the tread band, characterized in that the tread band is obtained from a semi-finished vulcanizable product by means of the process outlined above.

Tires comprising tread bands obtained from a semi-finished product of this type are characterized in that 99.73% of a plurality of test pieces taken from the corresponding tread bands have a modulus value, with respect to 100% and 300% elongation, which shows a Standard Deviation $3\sigma$, relative to the average value of the modulus for the said plurality of test samples, of less than ±0.5 and more specifically of about ±0.36.

In a further aspect, the invention relates to a method for continuously producing a rubber compound, for use in tires for vehicle wheels, whose ingredients include a polymer base containing an unsaturated chain which can be crosslinked with sulphur-based systems, at least one silica-based reinforcing filler, a silica-binding agent based on a silane containing at least one sulphur atom and a vulcanizing system, characterized by low energy consumption.

In particular, in accordance with the said method, the power absorbed to mix and advance the said blend along the blend mixing and advance path is, in its whole, less than 0.250 kW/kg and preferably between 0.165 kW/kg and 0.200 kW/kg: even more preferably, the power absorbed in the said initial stretch is at least equal to 75% of the overall power absorbed in the said path.

In any event, the present invention will be understood more clearly with the aid of the description which follows and the appended figures, which are given purely by way of non-limiting examples, in which.

The process for the continuous production of a compound for tires filled with a silica reinforcing filler, according to the invention, as already anticipated, consists essentially in mixing the ingredients of the compound along a path for mixing and advancing the blend, which provides for at least three successive stretches, namely an initial stretch, an intermediate stretch and a final stretch, which differ from each other in the type and amount of mechanical work carried out on the blend as it passes along the corresponding stretch: the heat profile of the blend is controlled along the entire length of the path by means of temperature and viscosity values which are determined at defined points on the path, the said heat profile preferably being assigned a course which first increases, up to a maximum temperature for the blend, preferably not above 160° C., and then decreases, and, even more preferably, is free of inversions of behaviour in each of the two branches, of increase and decrease respectively.

Figures 1, 2, 3:
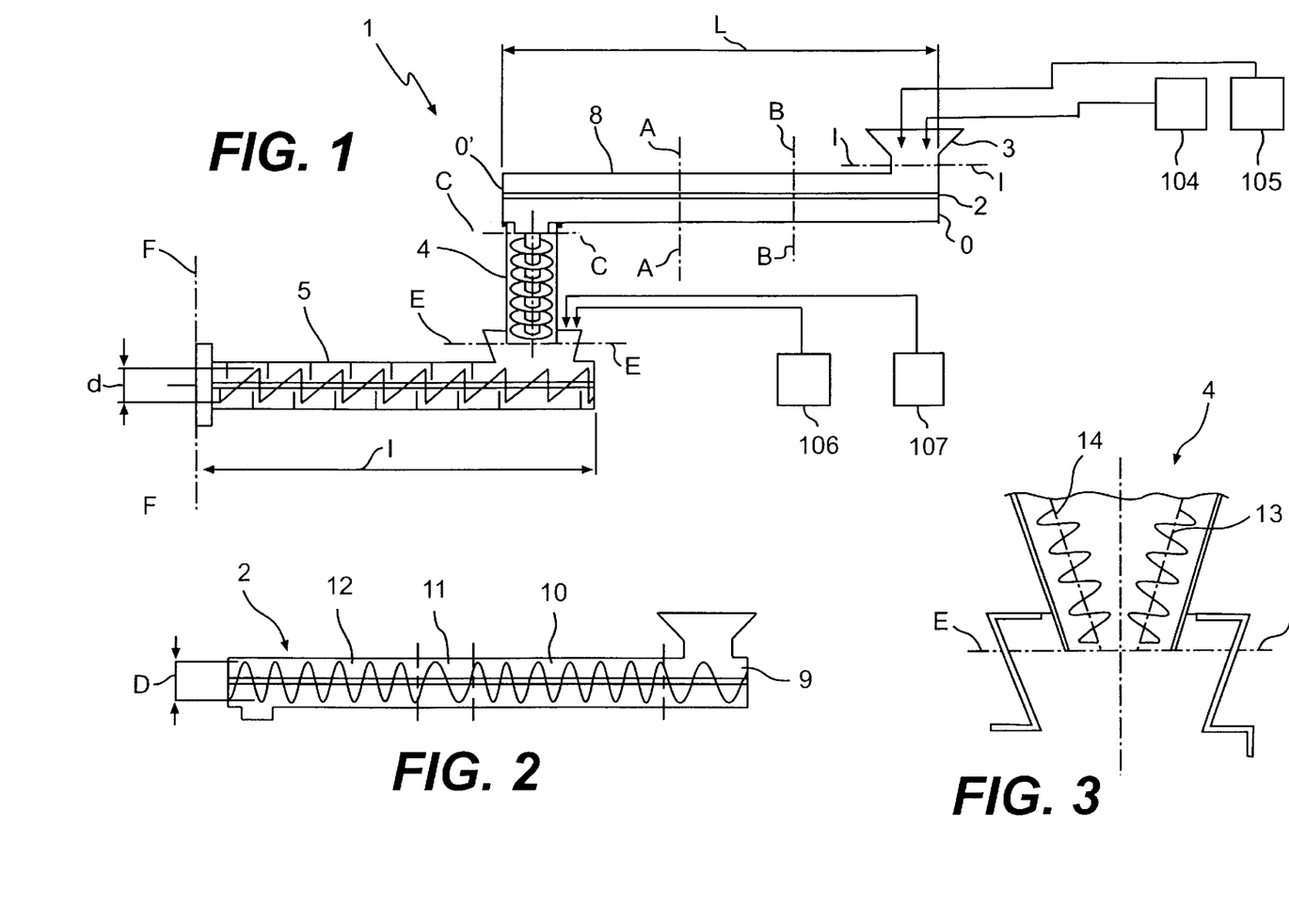
FIG. 1 is a schematic representation of a plant for carrying out the process according to the invention.
FIG. 2 is a first detail of the plant shown in FIG. 1.
FIG. 3 is a second detail of the plant shown in FIG. 1.

The abovementioned process is preferably carried out using plant 1 in FIG. 1.

In the example described, plant 1 is designed for the continuous production of compounds for tread bands or, alternatively, of tread bands for tires, formed of a rubber compound mainly comprising a polymer base containing an unsaturated chain which can be crosslinked with sulphur-based systems, at least one silica-based reinforcing filler, a silane-based binding agent containing at least one sulphur atom and a vulcanizing system.

Among polymer bases useful for the purposes of the invention, polymers or copolymers containing an unsaturated chain obtained by polymerization of conjugated dienes and/or vinyl, aliphatic or aromatic monomers are mentioned.

The base polymers can be formed of natural rubber, poly(1,4-cis-butadiene), polychloroprene, poly(1,4-cis-isoprene), isoprene/isobutene (optionally halogenated), butadiene/acrylonitrile or styrene/butadiene copolymers, and styrene/butadiene/isoprene terpolymers, which are obtained either in solution or in emulsion, and ethylene/propylene/diene terpolymers.

Plant 1 essentially comprises a twin-screw mixer 2 which is continuously fed from a charging hopper 3 with polymer material and various ingredients arriving from appropriate tanks 104 and 105, a device 4 for transferring and cooling the blend and a single-screw extruder 5 which is fed continuously and directly, from its charging hopper, with the blend from the device 4 as well as, separately, with ingredients for the vulcanization system from tanks 106 and 107.

More specifically, the twin-screw mixer 2 consists of an extruder of axial length "L" measured between a first end O and a second end O', in whose chamber 8 are located two screws arranged side by side, which preferably rotate in opposite directions to each other; these screws are provided along their longitudinal length with an appropriately shaped flight in order to mix and transport the blend inside the body of the extruder. The mixer forms the first stretch of the said path for mixing and advancing the blend: the aperture of the loading hopper 3 on the body of the extruder corresponds essentially to the inlet section I—I of the said first stretch, and the aperture for unloading the material into the transfer device 4 corresponds substantially to the outlet section C—C of the said stretch. In accordance with the invention, this type of mixer preferably has a ratio between the diameter "D" of each screw and the length "L" of the body of the extruder, which has a value of between 8 and 15. In the plant described and shown herein, the length "L" of the mixer 2 is 1300 mm and the ratio L/D is equal to 10.

The mixer 2 can comprise many different embodiments, a number of which can be found in machines already commercially available, for example in the machines and equipment from the companies Farrel, Werner & Pfleiderer, and Pomini, respectively.

At any event, irrespective of the profile of the screws, the sizes of the chamber and the cooling system provided, the mixer, in accordance with the invention, has to enable processing of the compound which reaches and maintains temperature and viscosity values along the chamber within a predetermined range: more particularly, the heat profile of the blend undergoing processing is controlled on the basis of readings of the temperature and viscosity values each at at least two points along the mixer, and preferably at at least three points.

While it is possible to measure the said temperature and viscosity values separately from each other, at separate points on the path, the Applicant prefers to carry out these measurements on the same sections, preferably on the outlet section C—C and on the section labelled "A—A" in FIG. 1, and, even more preferably, also at a further third point, that is to say on the section labelled "B—B" again in FIG. 1.

More specifically, section A—A is preferably located at a distance from the first end O which is between 55% and 65% of L; in this section, the temperature $T_A$ of the blend is preferably between 110 and 120° C. and the corresponding viscosity $\eta_A$ between 540 and 660 Pa*s (Pascal seconds).

On the outlet section C—C, the temperature value $T_C$ and viscosity value $\eta_C$ are preferably between 150 and 160° C. and between 300 and 380 Pa*s, respectively.

Preferably, as stated, the heat profile of the blend in mixer 2 is controlled at at least a further third point, that is to say on section B—B.

More precisely, section B—B is located at a distance from the first end O which is preferably between 35% and 45% of L; in this section, the temperature $T_B$ of the blend is preferably between 55 and 65° C. and the corresponding viscosity $\eta_B$ between 8500 and 7000 Pa*s.

The temperatures can conveniently be determined using probes formed from thermocouples made of iron/constantan material of the Standard/Pomini type, which are identified by the commercial reference JXIL.

The viscosities are conveniently measured using the Rheo-Vulkameter instrument from the company Gottfert by extruding the compound through a capillary ½0 mm in diameter at a pressure of 80 bar for a period of 30 sec. From the volume extruded through the capillary the throughput is measured and, from this value, the viscosity in units of Pa*s is determined. Preferably, the measurements are taken directly on a sample of compound tapped from a specific aperture in the chamber 8 located at the desired point.

Preferred embodiments of the plant 1 are thus formed by mixers 2 comprising a pair of screws, at least one of which has a profile which differs from one zone to another along the longitudinal length of the chamber 8, that is to say it has a series of successive profiles which alternate from one to another, a few mainly being capable of carrying out intense mechanical processing of the material, (dispersion of the ingredients in the blend although this is not separate from a thrusting action for advance of the blend), and others which are more specifically intended to bring about advance of the blend along the body of the mixer, even though they help to carry out a certain mixing action.

The profiles of the screws have an angle of inclination relative to the longitudinal axis of the screw which is preferably between 10° and 30° in the zones involving intense levels of processing, and between 20° and 40° in the advancing zones.

Preferably, four zones 9, 10, 11, 12 are provided along the body of the mixer (FIG. 2), two mainly for advance and two mainly for mechanical processing; in particular, the second and fourth zones, 10 and 12, from the first end O are adapted for intense mechanical processing.

Preferably, in the second zone 10, the two screws have tangential profiles and, even more preferably, the profiles of the two screws in zone 12 interlock, in order to increase the dispersion of the components in the compound.

In all of these solutions, sections A—A and B—B are located in zones in which the profiles of the screws are particularly suited to intense mechanical processing of the blend.

The temperature and viscosity values of the blend are maintained within the ranges specified above by means of the cooling and regulation devices provided, in a known manner, on the extruders of the plant described.

The reaction of the silane with the silica preferably needs to be at least 85% complete on leaving the mixer. The extent of the reaction is measured by means and methods that are all known and are not included in the present invention.

In accordance with the invention, the intermediate stretch of the path for mixing and advance of the blend is formed by a device 4 for transferring and cooling the blend. This cooling and transfer device is represented in FIG. 1 with its longitudinal axis conveniently aligned with the discharge orifice of the mixer 2 and the feed orifice of a single-screw extruder which will be discussed later: however, the said device may be placed in other positions and furthermore its axis may be in various other orientations.

The device 4 according to the invention is used to cool the blend leaving the mixer, bringing it to a temperature below the crosslinking temperature; this is carried out essentially without any input of mechanical work into the blend, apart from the small amount required to transfer the material between the ends of the device, that is to say from the inlet section C—C to the outlet section E—E. It should be noted that in the preferred arrangement illustrated in FIG. 1, the outlet section C—C of the mixer 2 essentially matches up with the inlet section C—C of the device 4.

Many different preferred embodiments of the device 4 are possible, all of which provide controlled cooling systems based on the circulation of gaseous or liquid fluids, or both, inside the device, preferably with insulation of the internal space of the device from the external environment and thus from the ambient temperature. One possible embodiment envisages using an Archimedean screw for moving the material, positioned with its vertical axis of rotation perpendicular to the plane of the outlet section of the device: a different version envisages a plurality of pairs of toothed gears whose centers of rotation are arranged on two inclined axes convergent on the outlet section of the device, close to the inlet of the single-screw extruder. In the position of the maximum divergence, the two axes are close to the inlet section of the device, that is to say the outlet section of the twin-screw mixer.

In the first solution, the vertical arrangement of the screw of the device 4 has been chosen in order to assist transfer of the material only, while at the same time cooling it by circulating water inside the Archimedean screw.

In a more preferred solution, represented schematically in FIG. 3, the device 4 provides two screws 13, 14, rotating in opposite directions to each other, with axes inclined as indicated above. The material is cooled by circulating water inside the shafts of the pairs of screws.

It should be observed that, irrespective of the embodiment of the device 4, the material exiting the mixer 2 at a maximum temperature of 160° C. is cooled to a temperature preferably between 100 and 110° C., while checking that the corresponding viscosity is between 650 and 600 Pa*s, and is introduced continuously into the downstream single-screw extruder, together with the ingredients of the vulcanizing system which need to be dispersed in the blend in order to produce vulcanizable compounds.

Preferably, the material leaving the device 4 is introduced into the single-screw extruder at a temperature of about 100° C.

The final stretch of the path for mixing and advancing the blend, in accordance with the invention, is formed by a single-screw extruder which consists essentially of an extruder of length "1", measured between its two ends, provided with a single screw, of the same length 1 as that of the body of the extruder, this extruder having, along its longitudinal length, an appropriately shaped flight in order to mix and transport the blend inside the said body of the extruder. Usually, the body of the extruder ends with an outlet die which is appropriately shaped for extruding a semi-finished product with the desired right cross-section.

The aperture of the loading hopper on th body of the extruder essentially matches the inlet section E—E of the said final stretch, and the aperture of the outlet die for the exiting material essentially matches the outlet section F—F of the abovementioned stretch. This type of mixer, according to the invention, has a ratio —between the diameter "d" of the screw and the length "1" of the body of the extruder—of between 6 and 12.

In the plant described and illustrated in FIG. 1, the length "1" of the single-screw extruder 5 is 900 mm and the ratio 1/d is equal to 10. It should also be noted that in the arrangement illustrated in the figure, the inlet section E—E of the extruder 5 essentially matches the outlet section E—E of the device 4.

The single-screw extruder can be of the type known to skilled people by the name "Pin Convert" available from many companies including, for example, the company "Berstoff" and the company "Krupp Machinentechnik".

Preferably, the temperature value $T_F$ and the viscosity value $\eta_F$ on the outlet section F—F of the extruder 5 are, respectively, between 100 and 110° C. and between 550 and 600 Pa*s, and preferably not higher than the corresponding values of the inlet section.

In the plant which is here described, the outlet die of the extruder 5 has dimensions such as to extrude continuously a sheet of compound 300 to 350 mm in width and 6 to 8 mm in thickness, or alternatively a strip of compound shaped on its cross-section to the size of a tread band of equal volume.

A practical embodiment of the process of the invention for the continuous production of a tread rubber will now be described.

A base polymer which can be crosslinked with sulphur, formed of styrene butadiene rubber (SBR), reinforcing fillers including silica, a silica-binding agent consisting of a silane containing at least one sulphur atom, various other ingredients, except for the vulcanization system, and other processing ingredients were loaded together into the hopper 3. To facilitate loading of the polymer and the reinforcing fillers, it may be convenient to use a master batch (with carbon black or with silica), that is to say pre-mixed blends of polymer and reinforcing filler.

More particularly, the ingredients of the blend introduced via the hopper corresponded to the following parts by weight relative to 100 parts by weight of the polymer base:

| | |
|---|---|
| Polymer base, SBR rubber | 100 |
| N115-type carbon black (Cabot Corporation) | 30 |
| VN3 silica | 35 |
| Extender oil | 1.5 |
| Silane Si 69 | 3.5 |
| Coumarone resin | 7.5 |
| Zinc oxide | 2.5 |
| Stearic acid | 2 |
| Anti-ageing agent 6PPD (Santoflex 13) | 1.5 |
| Anti-fatigue agent TMQ (Vulcanox) | 1.5 |

The amount of silica-based reinforcing filler can range from 10 to 90 parts by weight per 100 parts by weight of polymer base, with the silica-binding agent in an amount of between 4 and 15 parts by weight per 100 parts by weight of silica-based reinforcing filler, and preferably between 8 and 10 parts by weight per 100 parts by weight of silica-based reinforcing filler.

The silica had a surface area, measured according to the BET method, equal to 175 m$^2$/g; preferably, the surface area should be between 100 and 300 m$^2$/g. Specifically, it was a VN3-type silica sold by Degussa.

The silica-binding agents are silanes and the following can be used in particular:

Bis(2-triethoxysilylpropyl)tetrasulphide,
Bis(3-trimethoxysilylpropyl)tetrasulphide,
Bis(2-trimethoxysilylethyl)tetrasulphide.

Preferably, a silane sold by Degussa, known under the commercial reference Si 69 [Bis(3-triethoxysilylpropyl) tetrasulphane] was used.

The ingredients introduced into the hopper 3 are delivered into the first zone 9 of the body of the extruder, where they undergo premixing with the aid of the pair of screws rotated at an angular velocity of between 45 and 55 rev/min; this premixing gives rise to a blend which is advanced along the body of the extruder.

In particular, the chemical reaction between the silica and the silane is initiated, and this reaction then proceeds gradually throughout the production cycle.

The blend now flows into the second zone 10: the mechanical processing of the material in the abovesaid zone is particularly intensive, so as to obtain a high level of dispersion of the silica and of the other ingredients in the base polymer.

In the section B—B of the second zone 10, the blend reaches a temperature $T_B$ of about 55° C. and a viscosity $\eta_B$ with a value of about 8000 Pa*s.

The subsequent third zone 11 mainly furthers the advance of the material towards the final zone 12 where the material arrives at section A–A with a temperature $T_A$ of about 120° and a viscosity $\eta_A$ of about 600 Pa*s.

The final zone 12 is again a zone in which intensive mechanical processing takes place in order to maximize dispersion of the silica and the homogenization of the blend.

The blend in the outlet section C—C has a temperature $T_C$ of not less than 150° C. and not more than 160° C.; the viscosity $\eta_C$ is 340 Pa*s with variations of plus or minus 10% of this value as the temperature varies within the said range.

With the formula indicated and the machinery properties specified above, the throughput of mixer 2 can be between 200 and 400 kg/h and the duration of the processing of the blend can range from 2 to 3 minutes with the compound advancing at a speed of between 0.7 and 1.1 cm/sec.

The blend leaving the mixer is conveyed directly and without interruption into the cooling and transfer device 4, in which it is cooled, in a manner which is entirely insensitive to variations in the external ambient temperature, arriving at the loading hopper of the single-screw extruder 5 at a temperature of about 100° C. with a viscosity of about 600 Pa*s. The residence time in the cooling device is between 2 and 3 minutes.

Other ingredients can be introduced into the hopper of the extruder 5 but, in particular, the ingredients of the vulcanizing system are introduced.

More specifically, the other ingredients conveyed into the hopper included those indicated below (vulcanization accelerators) with their respective parts by weight per 100 parts by weight of the base polymer:

| | |
|---|---|
| Diphenylguanidine (DPG 80) | 1.25 |
| Benzothiazylsulphenamide (TBBS) | 1.5 |
| Sulphur | 1 |
| Cyclohexylthiophthalimide | 0.2 |

In the extruder 5, the blend is advanced and subjected to reciprocal mixing by the rotation of the relevant screw by a motor unit (not illustrated) at an angular velocity of between 35 and 45 rev/min. The processing time is between 2 and 3 minutes. The mechanical processing of the material is substantially less than that carried out in the mixer 2.

One of the fundamental aspects of the process according to the invention is the dispersion of the vulcanizing agent by means of a single-screw extruder, at essentially constant temperature. The dispersion of the vulcanizing system is effected with moderate mixing without causing large increases in temperature, which might entail risks of premature crosslinking.

The single-screw extruder is controlled such that the mechanical processing is not intensive and does not cause inversion of the heat profile of the blend, whose temperature indeed remains essentially constant in the range 100–110° C., while the viscosity falls to a value essentially of around 500 Pa*s.

The single-screw extruder 5 continuously extrudes an extrudate of the compound which is cooled to temperatures below 30° C. and collected, for example, in the form of sheets in overlapping loops in a suitable container (not illustrated), after which they are then processed in another device in order to obtain a semi-finished product with a shape corresponding to that of the tread band desired for the manufacture of a specific model of tire.

In another preferred embodiment, the single-screw extruder is provided with an appropriately shaped outlet die in order to directly extrude a strip of unlimited length, corresponding to a continuous length of tread band.

Figure 4:
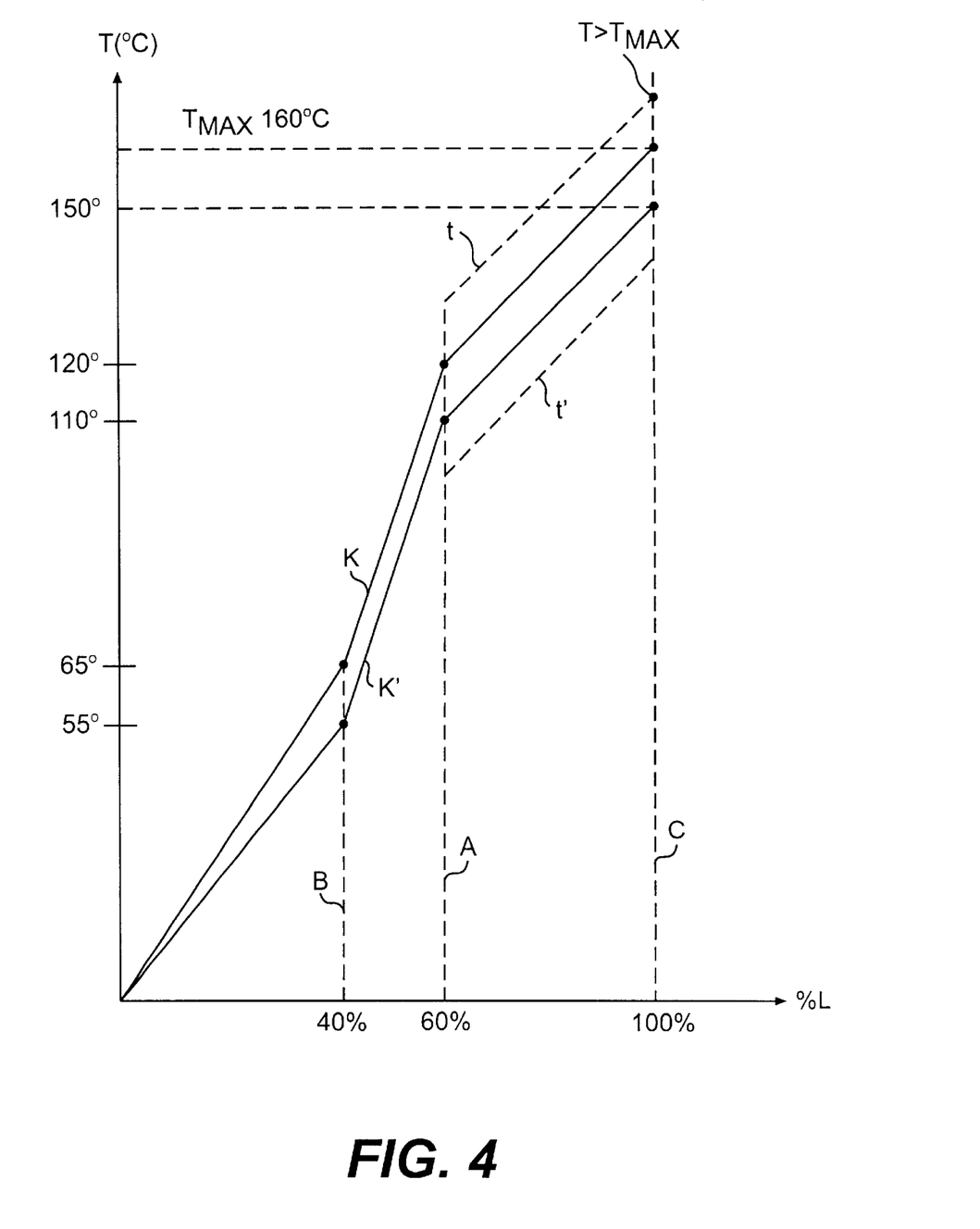
FIG. 4 is a graph plotting variation in the temperatures allowed for plants designed to carry out the process according to the invention.

For the purposes of making the invention clearer, FIG. 4 shows a diagram, on the X-axis of which are given, in percentage values relative to the length L, the distances of the sections B—B, A—A, C—C from the first end O of the mixer 2, and, on the Y-axis, the corresponding temperatures in these sections.

As has already been stated, irrespective of the embodiment of the mixer, the fact that phases of advance and of mechanical processing of the compound are carried out so as to develop a blend heat profile characterized by a predetermined temperature and viscosity gradient for the material constitutes one of the most important characteristics of the process of the invention.

The diagram in FIG. 4 shows two lines, K and K' respectively, qualitatively delimiting the maximum and minimum values of the range within which the temperature variations stipulated by the process according to the invention have to be maintained.

In other words, the blend generated from the material introduced into the hopper 3 can adopt, in the mixer 2, temperature values along the two lines K and K' as well as inside these lines.

The process according to the invention preferably envisages preventing section A—A from reaching a temperature above that delimited by the line K and below that delimited by the line K'. The reason for this is that if the process of mechanically processing the compound were to allow temperatures above the value defined by the line K, there would be a variation in the temperature between sections A—A and C—C along the dashed line t, thereby causing the section C—C to reach a value above 160° C. and running the risk of precrosslinking of the compound taking place.

Thus, if the process were to allow section A—A to reach temperatures below the value defined by the line K', the temperatures between sections A—A and C—C would still proceed along the dashed line t', with section C—C reaching a temperature value below 150° C. and running the risk of the reaction between the silica and the silane being incomplete.

In this respect, it is considered that a possible reason for the improvements obtained in the compound of the invention might result from the way in which, in the process according to the invention, the chemical reaction between the silica and the silane takes place.

Figure 5:
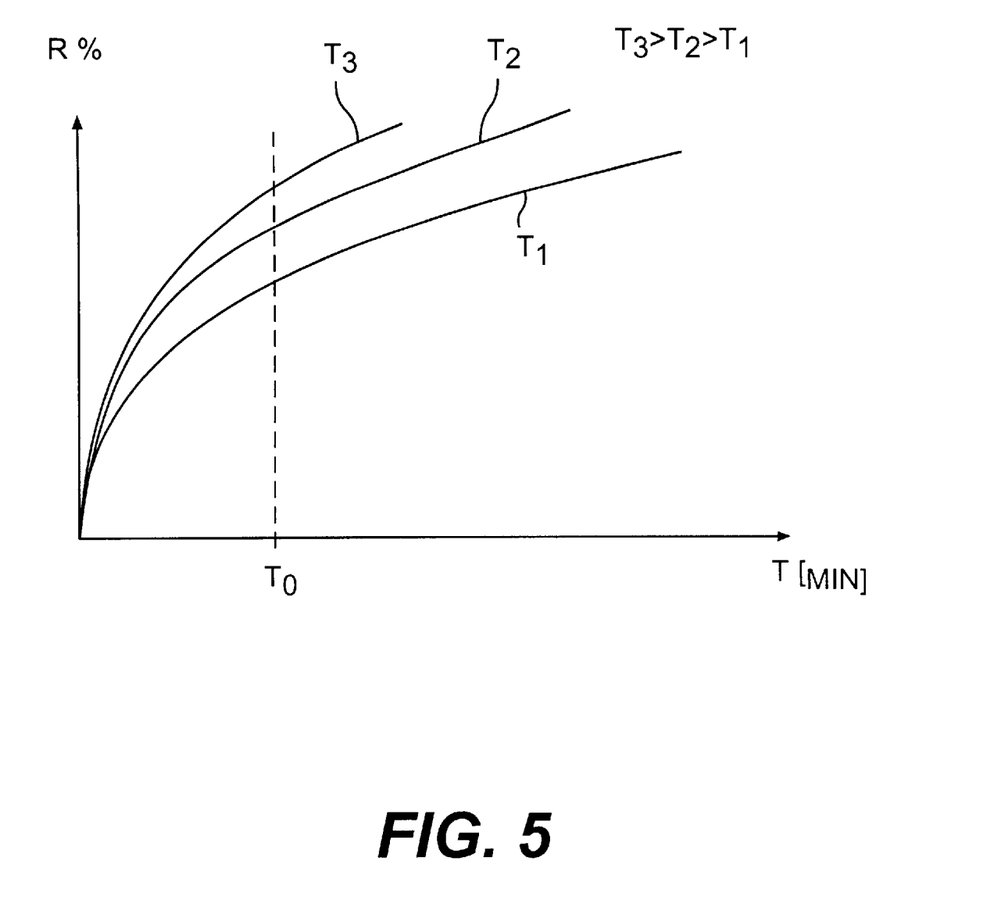
FIG. 5 is a graph showing the progress of the silica/silane reaction in a process for manufacturing tread bands.

It has been found that the degree of silanization can be represented, at least to a certain approximation and for qualitative purposes, by the graph in FIG. 5, in which the y-axis indicates the degree of silanization R expressed in percentage values, and the x-axis indicates the time, expressed in minutes, during which the reaction takes place.

As can be seen by studying the graph, the reaction, for an equal temperature T, shows a rapid initial increase in the silanization before tailing off to an increasing degree of silanization but over a longer period.

Moreover, it is seen that, for an equal reaction time t, the degree of silanization increases as the temperature increases ($T_1 < T_2 < T_3$).

Thus, the reaction between the silane and the silica depends on the temperature and on how long this temperature acts and, in practice, involves the entire manufacturing cycle of the compound, from the phase of initial mixing of the ingredients to completion with dispersion of the vulcanizing system in the blend.

In the known process, the periodic phases of cooling of the blend which occur at intervals in the compound preparation cycle result in a non-uniform development of the degree of silanization, which has a negative influence on the homogeneity properties of the final semi-finished product.

Moreover, in the case where the process were to allow higher viscosity values in section A—A than indicated above, there would be a risk of maintaining an excessive viscosity value at the end, which is an indication of insufficient dispersion of the silica in the polymer mass.

If on the other hand the process were to allow viscosity values lower than those already indicated in section A—A, there would be a risk of the material reaching an undesired, excessive level of fluidity in section C—C, with consequent excessive stickiness causing many problems in the subsequent stages of manufacture of the tire.

As can be seen, the area enclosed by the two lines K and K' is fairly limited, as a result of which the temperature variations allowed by the process are small and this is reflected in high uniformity of the properties of the final product, as will become more apparent in the following tests.

Semi-finished products obtained by the known batchwise process using Banbury-type mixers, as described in the abovementioned patent application, were compared with semi-finished products obtained by the process according to the invention.

The comparative semi-finished products, of the type designed to form tread bands, had the same chemical composition corresponding to that described in the present text.

TABLE 1

| Compound produced according to the invention | | | | Compound produced in a known manner | | | |
|---|---|---|---|---|---|---|---|
| Viscosity | CA1 | CA3 | IRHD | Viscosity | CA1 | CA3 | IRHD |
| 82 | 2.25 | 8.22 | 75.9 | 72.8 | 2.07 | 8.5 | 71.4 |
| 81 | 2.33 | 8.35 | 76.9 | 77.4 | 2.6 | 10.2 | 77.5 |
| 81 | 2.1 | 8.56 | 75.4 | 74.3 | 2.3 | 9.4 | 75.7 |
| 82 | 2.42 | 8.42 | 78.3 | 72.1 | 2.51 | 9.8 | 75.8 |
| 82 | 2.19 | 8.34 | 78.7 | 73 | 2.43 | 10 | 75.8 |
| 80 | 2.03 | 8.5 | 74.1 | 70.4 | 2.4 | 9.4 | 75 |
| 79 | 2.19 | 8.45 | 75.2 | 71.7 | 2.47 | 10.3 | 74.5 |
| 78 | 2.12 | 8.54 | 74.9 | 72.3 | 2.59 | 9.7 | 74.5 |
| 78 | 2.25 | 8.55 | 76.5 | 72.7 | 2.61 | 9.2 | 76 |
| Average value $\bar{x}$ | | | | | | | |
| 80.33 | 2.21 | 8.44 | 76.22 | 72.97 | 2.44 | 9.61 | 75.33 |
| Standard Deviation 1σ | | | | | | | |
| 1.66 | 0.12 | 0.12 | 1.55 | 1.97 | 0.17 | 6.56 | 1.67 |
| Percentage variations in the 1σ values for the compounds of the invention relative to the known values: | | | | | | | |
| Viscosity | | CA1 | | CA3 | | IRHD | |
| +15.7% | | +29.4% | | +78.5% | | +7.1% | |

The above table collates the results of the comparative tests on the following properties:

Viscosity of the crude semi-finished product after addition of the vulcanizing system to the compound; the measurement is made in Mooney units according to ISO standard 289-1 at a temperature of 100° C., using the Monsanto MV 2000 E instrument according to procedure ML (1+4);

Modulus values at 100% (CA1) and at 300% (CA3) elongation on test pieces of semi-finished products after vulcanization; the test was carried out according to ISO standard 37, by measuring the force, in MPa (MegaPascals) required to produce the abovementioned elongations on the test pieces;

Hardness on test pieces of vulcanized semi-finished products; the hardness was measured in IRHD units, working according to ISO standard 48.

As can be shown directly from Table 1, the compounds produced by the process according to the invention are considerably more uniform than those produced by known processes, as demonstrated by the lower standard deviation of the values of the properties examined.

It is known that, according to the statistical law of Standard Deviation, given a certain number of values distributed around an average value, the standard deviations $1\sigma 2\sigma 3\sigma$ indicate, by their deviation from the average value, the size of the intervals in which 68.26%, 95.44% and 99.73% respectively of the values of the abovementioned quantity are found.

The Theory of Standard Deviation makes it possible to calculate easily, using a well-known mathematical formula, the standard deviation values for a set of given values. It is clear that a wide scatter of values around the average value will give rise to very large standard deviations, whereas a high concentration of values around the abovementioned average value will give rise to very small standard deviations.

The improvements obtained in the properties of the modulus at 100% and at 300% elongation can be seen particularly clearly in the abovementioned table.

For example, if we consider the modulus CA3 for the compounds of the invention, given the value of $1\sigma$ reported in the table, equal to 0.12, by the statistical law of normal distribution, 99.73% of the values of the whole range of test pieces will be within an interval equal to $\pm 3\sigma$, that is to say equal to ±0.36 (0.12×3). When the same calculation is carried out for the values of the CA3 modulus for the compounds produced by the known method, a corresponding value for the interval equal to ±1.68, that is to say 0.56×3, is found.

When the calculation is repeated for CA1 modulus values of the comparative compounds, a value of ±0.36 is again found, compared with a value of ±0.51.

Similar results are found when extending the examination of the values to the properties of viscosity and hardness: in particular, it can be seen that virtually 100% (99.73%) of the test pieces of the crude compound produced according to the invention have a viscosity value within ±3σ range of less than ±5 (1.66×3=4.98) as compared with the corresponding range, for the compound produced in a known manner, of considerably more than ±5 (1.97×3=5.91).

The invention furthermore has the advantage of a process which is carried out with substantially less energy consumption than the known process.

On this subject, Table 2 below compares, on the left, the energy consumption of the known process with, on the right, that of the process according to the invention.

The compound for both processes is that already stated above.

The known process is carried out according to the stages of the Applicant's patent application, which has already been mentioned several times in this description.

The energy consumption figures were obtained by measuring the power absorbed by the motors for the various phases of mechanical processing of the compound. The unit of measurement is the kW/kg.

TABLE 2

| Known process, batchwise | | Continuous process according to the invention | |
| --- | --- | --- | --- |
| Phase 1 | 0.115 kW/kg | Twin-screw mixer | 0.150 kW/kg |
| Phase 2 | 0.080 kW/kg | Single-screw extruder | 0.030 kW/kg |
| Final phase | 0.065 kW/kg | Transfer device | — |

The consumption of the transfer and cooling device 4 is not given in the table since it has negligible influence on the sum total of the power absorbed by the mixer and by the extruder.

The total consumption of the known process is 0.260 kW/kg, compared with a consumption of 0.180 kW/kg for the process according to the invention.

It may be that one of the reasons for the higher energy consumption of the known process is the stages needed to return the temperature of the compound, after each cooling, from room temperature to a temperature of about 100° C.

The process according to the invention avoids these energy consumptions since the material leaving the mixer 2 is conveyed directly to the cooling device 4 and, from the latter, is introduced directly into the single-screw extruder 5 at a temperature of about 100° C. Further reduction of the energy consumption then depends on the overall mechanical processing of the compound being less than that which takes place in the known process.

The lower energy consumption is demonstrated by the viscosity value, measured using the Monsanto MV 2000 E instrument, according to the data reported in Table 1.

As may be seen, the viscosity of the extrudate leaving the single-screw extruder is about 10% higher than that of the final product of the known process: this unexpected result indicates that the lesser mechanical processing imparted to the compound by the process according to the invention has given rise to less breaking of the molecular chains of the base polymer but nevertheless achieving essentially the same level of dispersion of the silica and of silanization.

In other words, the processes of the prior art impart excessive mechanical processing to the compound, which, instead of increasing the degree of dispersion of the silica and of silanization of the compound, degrades the structural properties of the polymer and has a consequent negative impact on the level of quality of the final product.

This result is, indeed, advantageously demonstrated as regards the performance of the tires when in use: in particular, tires having the known convential structure described earlier, provided with tread bands produced by the process according to the invention and by the compound of the abovementioned formula, characterized by a crude viscosity, measured at 100° C., of greater than 76 ML (Mooney) and preferably between 78 and 82 ML (Mooney), have shown superior performance levels, particularly as far as regards the greater resistance to abrasion and the smaller resistance to rolling than those of the comparative tires, which are entirely identical to the prototype tires except that the tread band, of the same compound, produced according to the known batchwise method, had a crude viscosity, measured at 100° C., equal to or less than 73 ML (Mooney).

What is claimed is:

1. A process for producing a rubber compound for tires, ingredients of the rubber compound including a polymer base containing an unsaturated chain which can be crosslinked with sulphur-based systems, at least one silica-based reinforcing filler, a silica-binding agent including a silane containing at least one sulphur atom, and a vulcanizing system, the process comprising the steps of:

feeding the polymer base, the silica-based reinforcing filler, and the silica-binding agent ingredients continuously into a path for mixing and advancing an ingredient blend, wherein the mixing and advancing of the blend take place together;

controlling a heat profile of the blend in the initial stretch to maintain temperature and viscosity values for the blend in the outlet section of the initial stretch within defined ranges; and feeding the vulcanizing system continuously into the inlet section of the final stretch;

wherein the path includes an initial stretch, an intermediate stretch, and a final stretch, each stretch defined between respective inlet and outlet sections, and wherein the outlet section of the initial stretch essentially matches up with the inlet section of the intermediate stretch, and the outlet section of the intermediate stretch essentially matches up with the inlet section of the final stretch.

2. The process of claim 1, wherein a heat profile of the blend in the outlet section of the initial stretch includes a temperature between 150° C. and 160° C. and a viscosity between 300 Pa-sec and 380 Pa-sec.

3. The process of claim 1, wherein the heat profile of the blend in the initial stretch is controlled by determining temperature and viscosity values of the blend in a first intermediate section between the inlet and outlet sections of the initial stretch.

4. The process of claim 2, wherein the first intermediate section is located at a distance from the inlet section of the initial stretch between 55% and 65% of the distance between the inlet and outlet sections of the initial stretch.

5. The process of claim 4, wherein a heat profile of the blend in the first intermediate section of the initial stretch includes a temperature between 110° C. and 120° C. and a viscosity between 540 Pa-sec and 660 Pa-sec.

6. The process of claim 5, wherein a heat profile of the blend in the outlet section of the initial stretch includes a temperature between 150° C. and 160° C. and a viscosity between 300 Pa-sec and 380 Pa-sec.

7. The process of claim 1, wherein the heat profile of the blend in the initial stretch is controlled by determining the temperature and viscosity values of the blend in a second intermediate section between the inlet and outlet sections of the first stretch.

8. The process of claim 7, wherein the second intermediate section is located at a distance from the inlet section of the initial stretch between 35% and 45% of the distance between the inlet and outlet sections of the initial stretch.

9. The process of claim 8, wherein a heat profile of the blend in the second intermediate section of the initial stretch includes a temperature between 55° C. and 65° C. and a viscosity between 7,000 Pa-sec and 8,500 Pa-sec.

10. The process of claim 9, wherein a heat profile of the blend in the outlet section of the initial stretch includes a temperature between 150° C. and 160° C. and a viscosity between 300 Pa-sec and 380 Pa-sec.

11. The process of claim 1, wherein the blend in the intermediate stretch is cooled in a manner protected from variations in ambient temperature.

12. The process of claim 1, wherein a heat profile of the blend in the outlet section of the intermediate stretch includes a temperature between 100° C. and 110° C. and a viscosity between 600 Pa-sec and 650 Pa-sec.

13. The process of claim 1, wherein a heat profile of the blend in the outlet section of the final stretch includes a temperature not above 110° C. and a viscosity between 550 Pa-sec and 600 Pa-sec.

14. The process of claim 13, wherein a heat profile of the blend in the outlet section of the initial stretch includes a temperature between 150° C. and 160° C. and a viscosity between 300 Pa-sec and 380 Pa-sec.

15. The process of claim 14, wherein a heat profile of the blend in the outlet section of the intermediate stretch includes a temperature between 100° C. and 110° C. and a viscosity between 600 Pa-sec and 650 Pa-sec.

16. The process of claim 1, wherein the ingredients of the rubber compound include from 10 to 90 parts by weight of the silica-based reinforcing filler per 100 parts by weight of the polymer base.

17. The process of claim 1, wherein the ingredients of the rubber compound include from 4 to 15 parts by weight of the silica-binding agent per 100 parts by weight of the silica-based reinforcing filler.

18. The process of claim 1, wherein the silica-binding agent includes four sulphur atoms.

19. The process of claim 18, wherein the silica-binding agent consists essentially of bis(3-triethoxysilylpropyl) tetrasulphane.

20. The process of claim 1, wherein the initial stretch of the path for mixing and advancing the blend includes a twin-screw mixer.

21. The process of claim 20, wherein a first screw in the twin-screw mixer rotates in an opposite direction from a second screw.

22. The process of claim 21, wherein a first screw and a second screw in the twin-screw mixer rotate at a speed between 45 rev/min and 55 rev/min.

23. The process of claim 1, wherein the final stretch of the path for mixing and advancing the blend includes a single-screw extruder.

24. The process of claim 23, wherein a screw in the single-screw extruder rotates at a speed between 35 rev/min and 45 rev/min.

25. The process of claim 1, wherein the blend in the initial stretch advances at a speed between 0.5 cm/sec and 1.5 cm/sec.

26. The process of claim 1, wherein the throughput of the blend along the mixing and advancing path is between 200 kg/hr and 400 kg/hr.

27. The process of claim 1, wherein the throughput time in the mixing and advancing path, from the inlet section of the initial stretch to the outlet section of the final stretch, is between 5 minutes and 10 minutes.

28. The process of claim 1, wherein a total power absorbed to mix and advance the blend along the mixing and advancing path is less than 0.250 kW/kg.

29. The process of claim 28, wherein the total power is between 0.165 kW/kg and 0.200 kW/kg.

30. The process of claim 28, wherein a power absorbed in the initial stretch is at least 75% of the total power absorbed to mix and advance the blend along the mixing and advancing path.

* * * * *

UNITED STATES PATENT AND TRADEMARK OFFICE
CERTIFICATE OF CORRECTION

PATENT NO. : 6,313,212 B1
DATED : November 6, 2001
INVENTOR(S) : Renato Caretta et al.

It is certified that error appears in the above-identified patent and that said Letters Patent is hereby corrected as shown below:

Column 17,
Line 32, "claim 2" should read -- claim 3 --.

Column 18,
Line 36, "claim 21" should read -- claim 20 --.

Signed and Sealed this

Sixteenth Day of March, 2004

JON W. DUDAS
*Acting Director of the United States Patent and Trademark Office*